March 12, 1968     F. W. R. STARP     3,372,628

OPTICAL APPARATUS

Filed Jan. 19, 1966     3 Sheets-Sheet 1

INVENTOR:
FRANZ W. R. STARP
BY Amster & Rothstein
ATTORNEYS

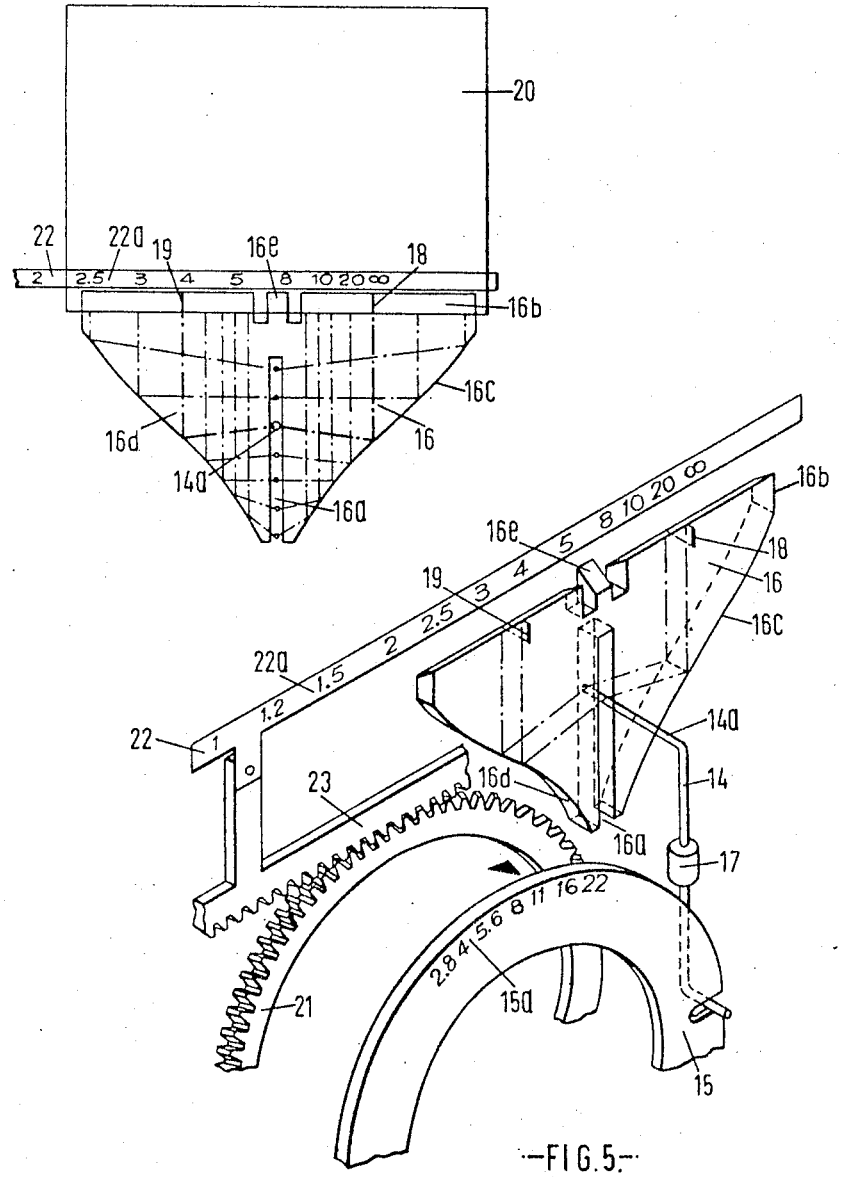

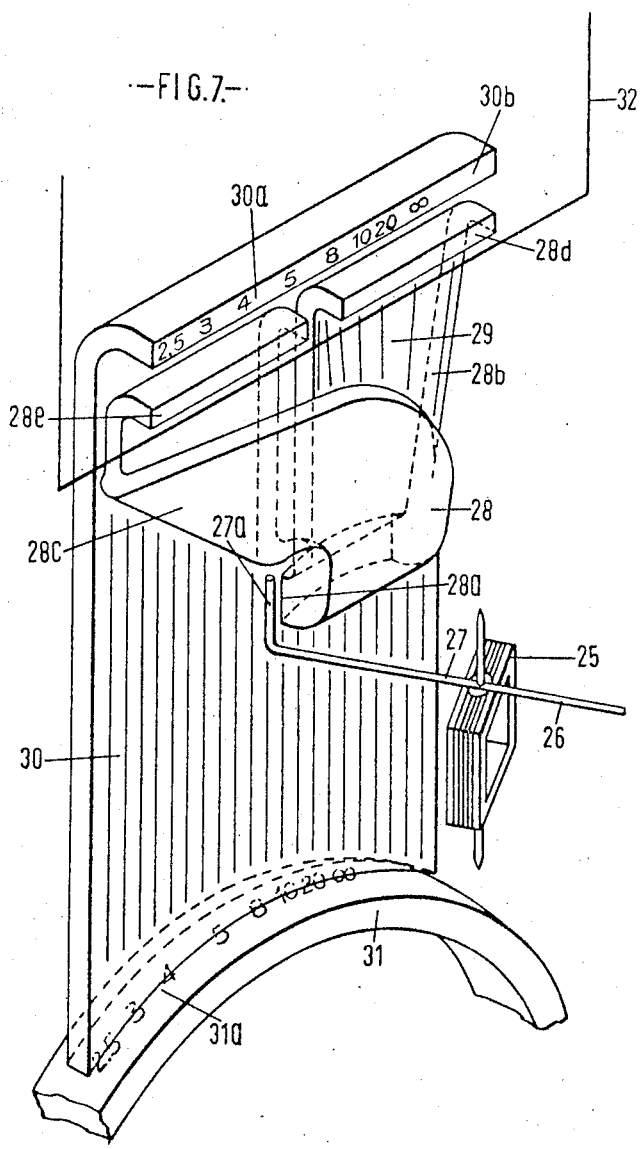

United States Patent Office 3,372,628
Patented Mar. 12, 1968

3,372,628
OPTICAL APPARATUS
Franz W. R. Starp, Calmbach, Black Forest, Germany, assignor to Prontor-Werk Alfred Gauthier G.m.b.H.
Filed Jan. 19, 1966, Ser. No. 521,610
Claims priority, application Germany, Jan. 21, 1965,
G 42,621
11 Claims. (Cl. 95—44)

The invention concerns an apparatus for indicating the depth of focus of a photographic objective lens. The apparatus shows the range of focal depth associated with a given aperture setting by using optical means and a focusing scale moving with the focal position of the lens.

Known indicating devices for depth of focus, as used in practice, are either difficult to operate owing to the arrangement of a symmetrical aperture scale, or they require expensive gearing means with discrete indication. Owing to the non-linear characteristics of the controls, i.e. the aperture and focussing members, it is necessary for the gear to be furnished with compensating devices which at one end (aperture f/2.8) have a reduction and at the other end (aperture f/22) a step-up, which makes the gearing relatively cumbersome. For this reason the use of such a gear and indicating device are out of the question in cameras having automatic exposure controlled by an exposure meter since the small driving force from the moving-coil light meter would not suffice to drive an indicating device and gearing elements of the kind referred to.

A device is already known which employs optical means, to indicate depth of focus, which device, in conjunction with a focussing scale varying with the lens setting, shows a depth-of-focus range associated with a certain aperture setting. To determine the focal depth in this arrangement, reference is made to the aperture of the lens diaphragm, and in dependency upon the width of the aperture a shadow region is formed on an image surface, which region indicates the depth of focus in connection with a focussing scale seen in the same image surface and varying together with the lens setting. This known indicating device is limited in its use to reflex cameras and is unsuitable for practical requirements as it uses as basis of reference the aperture opening disposed in the lens passage. This results in the image projected by the lens on to the ground glass screen of the camera becoming sharper as the aperture of the diaphragm diminishes.

The object of the present invention is to eliminate the disadvantages of known indicating devices and to provide an apparatus of the kind referred to above which by optical means uses the diaphragm aperture setting as a basis of reference to indicate the depth of focus in such a way that the invention is suitable for use in photographic apparatus other than reflex cameras.

In accordance with our invention there is provided an optical apparatus for indicating the depth of focus of a photographic lens for a given aperture with respect to a focussing scale moving with the lens setting, in which a reference pointer displaceable in accordance with the setting mechanism for the aperture is used, the end of which is so located with reference to light conducting means that two virtual images are produced in a viewing surface, their mutual spacing being dependent on the position of the pointer.

Reference should now be made to the accompanying drawings, in which.

Figure 4:
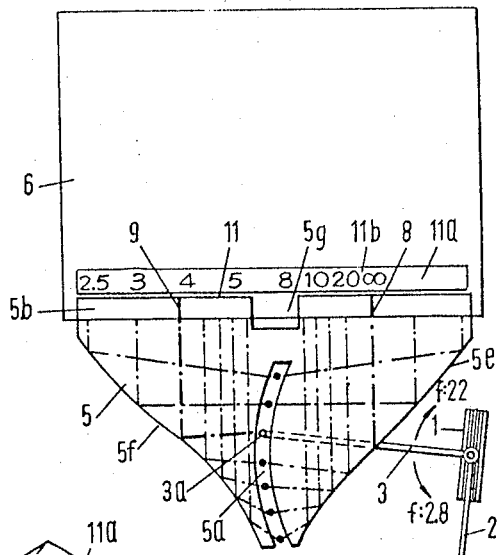
FIG. 4 is a plan view of the indicating device with ray paths shown, with the pointer position at aperture f/11; the ray path corresponding to this pointer position is shown in thick broken lines, the ray paths for other aperture values being shown in faint broken lines, with the range finder frame and the viewing surfaces of the prisms being hinged back into the plane of the drawing.

FIG. 5 is a perspective view of the indicating device in conjunction with a pointer which is displaceable by the diaphragm setting member, together with a scale which is moved when focussing the lens, FIG. 6 is a partial plan view of the indicating device according to FIG. 5 showing the ray paths as in FIG. 4, FIG. 7 is a further embodiment of an indicating device for cameras having an incorporated exposure meter, in which light conducting members are used for producing virtual pointer images.

Figure 2:
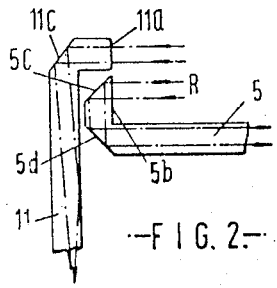
FIG. 2 is a partial side view of a double prism for the indication of the depth of focus and a scale image.
Figure 3:
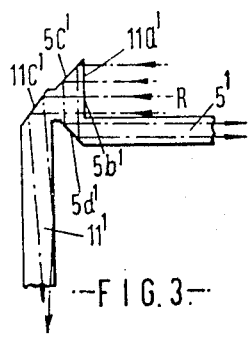
FIG. 3 is an arrangement of a single prism member to fulfill the functions of the arrangement of FIG. 2.

For the sake of simplicity, in the example according to FIGS. 1 to 4 only the movable member i.e. the moving-coil 1 of the light meter, in a camera is shown. Fixed to the moving-coil 1 are two pointers 2 and 3 of which one pointer 2 in co-operation with a stepped member 4 participating in the movement of the release member of the camera, serves to determine the lens aperture setting before the actual release occurs. The other pointer 3 has an end 3a which projects into an arcuate slit 5a of a double prism 5. The double prism 5 has a viewing surface 5b which may be so arranged with reference to the view finder 6 of the camera indicated in FIG. 4, that the person taking a photograph is able to see the viewing surface clearly when using the view finder to look at the object. The line of sight R, as evident from FIGS. 2 and 3, is so diverted within the prism 5 on the surfaces 5c and 5d by mirror reflection that it finally extends in the direction of the viewer. The line of sight is totally reflected in the prism surfaces 5e and 5f, in such a manner that with reference to FIGS. 1 and 4, in the right hand section the reflection occurs to the left on surface 5e, and in the left section reflection occurs to the right on surface 5f. The viewer therefore sees a double image of pointer 3 in its slit 5a, both from the right and from the left, these images appearing on each side of the viewing surface 5b, symmetrically about the central portion of this surface. This central portion of the viewing surface 5b, for reasons to be explained hereinafter, is formed in the embodiment of FIGS. 1 to 4 as a gap 5g.

In the embodiment according to FIGS. 1 to 4, the position of the pointers 2 and 3 corresponds to the aperture f/11. The end 3a of the pointer operating in the arcuate slit 5a of the double prism, owing to the optical effect of the prism, appears at two points 8 and 9 as virtual images on the viewing surface 5b. If the pointer 3 moves in a direction corresponding to a larger aperture opening the virtual images of the pointer appearing on the viewing surface 5b approach one another equidistantly from an imaginary axis of symmetry. A movement of the pointer in the opposite direction causes the virtual images of the pointer appearing on the viewing surface 5b to move away from one another. This operation is shown in FIG. 4 by the ray paths indicated in broken lines, each two ray paths identical with regard to the axis of symmetry of the double prism 5 or the viewing surface 5b, corresponding to a particular aperture value. The arrow directions in FIG. 4 show that turning the pointer 3 of the measuring mechanism to the extreme left results in an aperture setting of f/2.8; turning the pointer to the extreme right results in an aperture setting of f/22. It is evident from FIG. 4 that the prism surfaces 5e and 5f are so fashioned that the distance between the virtual images of pointer 3 at aperture f/2.8 and the like is relatively small, but if the pointer 3 is moved in the direction of the smaller aperture values, this distance increases. This spacing is so chosen that it always indicates the permissible depth of focus with the aperture used. The shapes of the reflecting surfaces 5e and 5f compensate for the circular movement of the pointer 3 of the light meter, so that despite the circular path of this pointer they produce symmetrical positions of the virtual images; they are therefore themselves assymmetric.

Figure 1:
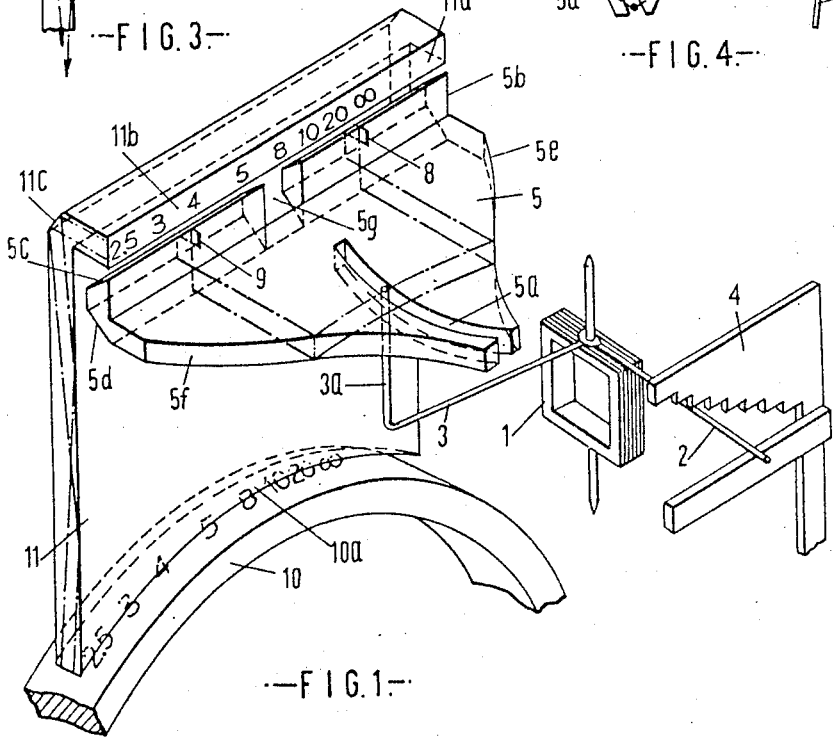
FIG. 1 is a perspective view of an indicating device provided for installation in a camera equipped with a exposure meter.

As explained above, the distance apart of the virtual images 8 and 9 dependent upon the position of the pointer 3 of the light meter and hence upon the lens aperture. When associated with a suitably calibrated focussing scale the position of which changes with the lens focus, the pointer images 8 and 9 define the depth of focus on this scale. In the embodiment of FIGS. 1 to 4 the scale of a focussing ring 10 is made visible directly in the illuminated frame range finder 6 by means of a prism 11. The viewing surface 11a of the prism 11 is located close to the viewing surface 5b of the double prism 5 described above. The scale 10a of the ring 10 is shown by prism 11 as a virtual scale image 11b on the viewing surface 11a. This virtual scale image moves when the ring 10 is turned, its scale 10a being carried past the adjacent surface of the prism 11. The virtual images 8 and 9 of the pointer 3 define the depth of focus on the scale image 11b appearing on the viewing surface 11a dependently on the position of the focussing ring 10. On the surface of the prism 11 facing the viewer as shown in FIGS. 1 and 2, the ray path associated with the scale observation is indicated in broken lines. As the rays are twice reflected, a laterally aligned and upright virtual image 11b of the scale 10a is obtained.

Although, in accordance with the illustration in FIG. 2, the device for indicating the depth of focus is formed of two prism members 5 and 11, the device in accordance with FIG. 3 is such that the two prisms are formed as a single member 5′, 11′, the viewing or reflecting surfaces of which are designated by 5b′ and 11a′ or 5c′, 5d′ and 11c′.

If the pointer 3 of the measuring mechanism assumes a position corresponding to an aperture beyond the maximum aperture of the lens, then no virtual image of the pointer appears on the viewing surface, since the two virtual images are at such a small distance from one another that they occur in the gap 5g. Since a photograph then taken would result in a faulty exposure, this effect may be employed for indicating the suitability of the light. With excessive subject lighting, the pointer images would be located outside the range of the viewing surfaces 5b. Preferably the end 3a of the pointer is highly coloured to render it easily visible under all conditions.

FIGS. 5 and 6 illustrate an embodiment for cameras which are not equipped with a built-in exposure meter. In this case a pointer 14 is used which at one end is coupled to the lens iris ring 15 provided with an aperture scale 15a. The other end of the pointer 14a runs in a slit 16a of a double prism 16. In this case the double prism 16, as distinct from the embodiment shown in FIGS. 1 to 4, assumes a vertical position with respect to the horizontal lens axis, so that the end of the pointer 14 is displaced relative to the prism 16 when the iris ring 15 is rotated. In accordance with the arrangement shown in FIGS. 5 and 6 the slit 16a in the double prism 16 extends in a straight line, so that the pointer 14 is guided so as to be rectilinearly displaceable. If the pointer 14, as in the embodiment shown in FIGS. 1 and 4 were mounted so as to be curvilinearly displaceable, would it be necessary for the pointer slit to be arcuate so that the reflecting surfaces 16c and 16d would have to be of the same shape as those of the embodiment in FIGS. 1 and 4.

As evident from FIGS. 5 and 6 a small prism 16a is located in the central portion of the viewing surface 16b of the double prism 16, in the region of the axis of symmetry this serving to illuminate the pointer slit 16a by daylight from the front of the view finder 20. The same effect is obtained in the embodiment according to FIGS. 1 to 4 by means of the gap 5g in the viewing surface 5b.

According to the embodiment shown in FIGS. 5 and 6 the prism 11 or 11′ of FIGS. 1 to 4 may be replaced by a scale 22 coupled to the range setting member 21 of the camera, so arranged that the calibrations 22a marked on the scale are visible adjacent to the viewing surface 16b of the double prism 16 in the view finder 20. If, as shown in FIG. 6, a small gap is provided between the scale band 22 and the double prism 16, the reason is to obtain a better distinction of the scale from the field of vision of the prism. The scale 22 may be displaced in a longitudinal direction by driving means such as a racked bar 23 connected to the range setting member 21.

The prisms producing the virtual pointer images may be made of transparent plastics material. If required, the reflecting surfaces may be coated with a reflecting layer. With a refractive index of 1.55 and more, however, they have a total reflection angle of about 40°, which is sufficient without a reflecting coating. It should also be noted that the prisms may be replaced by mirrors or the like, which must correspond in shape and position to the reflecting surfaces of the prisms.

FIG. 7 shows an embodiment of a device for indicating the depth of focus which uses fibre optics for producing virtual images instead of prisms. By "fibre optics" is meant a light conducting system comprising very thin glass fibres. These fibres for the present purpose are tightly bundled at both ends and surface ground, whilst in between they may be loose and bent. Each individual fibre conducts the light ray entering at one end by total reflection, and emits it at the other end. If the individual fibres in the bundle ends are so arranged that with the bundle stretched tight they all extend parallel, then an image formed on one face-ground end surface is visible by looking at the other end, even if the bundle sags or is bent.

Using this effect, it is possible in accordance with the embodiment as shown in FIG. 7 for light conducting bundles of fibres to be used to divide the image of a pointer into two virtual images and to reproduce pointer movement as virtual images. For reasons of illustration the fibre bundles are shown in FIG. 7 as solid blocks in strictly geometrical order and with the fibre structure only indicated at 29. The numeral 25 designates the displaceable moving-coil of an exposure meter to which pointers 26 and 27 are fixed, the bent over free end 27a passing over of the surface 28a of a glass fibre bundle 28. This fibre bundle is tightly bunched at one end, as evident from FIG. 7 and is divided into two individual strands 28b and 28c, one strand 28b of the bundle being continued in straight line, the other being twisted so that two juxtaposed flat viewing surfaces 28d and 28e are formed. In the embodiment the fibre bundle is not shown loosely suspended; the lines 29 indicate the fibre runs. The arrangement is such that in the surface 28a opposite the pointer end 27a the fibres are disposed from left to right, but in the viewing surface 28e they run from right to left and are closer together. If the pointer end 27a moves in front of the surface 28a, then its image will appear in the viewing surface 28d, and also, owing to the bundle division, in the viewing surface 28e. With the pointer in the position shown in FIG. 7 virtual images do not appear on the viewing surfaces 28d and 28e, since the pointer end 27a is located outside the surface 28a of the fibre bundle 28. The pointer position shown corresponds to the position of the moving-coil 25 when the light intensity acting on the photoelectric cell of the exposure meter is too low. Owing to the crossing over of the bundle strands 28c the two virtual images are disposed symmetrically about a vertical axis of symmetry between the two viewing surfaces 28d and 28e.

Movement of the pointer 27 produces equal and opposite movements of its virtual images as seen in surfaces 28d and 28e.

It would also be possible, using light conducting fibres as shown in FIG. 7, to provide an indicating device for depth of focus such that the object surface 28a of the fibre bundle 28, divided into two strands 28b and 28c to to be formed round the circumference of a diaphragm ring provided with a single indicator line, thus producing virtual images on both viewing surfaces 28d and 28e as shown in FIG. 7.

It is also possible in the arrangement according to FIG. 7 to use a focussing scale 30a as shown in FIGS. 1 to 4 as reference scale appearing on the viewing surface 30b of a prism 30 associated with the focussing ring 31, the scale 31a provided on the focussing ring being seen as a virtual image in the viewing surface 30b of the prism. It would also be possible to use a displaceable scale in accordance with the embodiment of FIG. 5. Finally, as shown in FIG. 7, a glass fibre bundle may be employed for the same purpose, one compactly gathered end of the bundle of which is adapted to the form of the focussing ring 31, the other end being formed as a viewing surface, it would be necessary for this fibre bundle to be provided with light conducting fibres located parallel to one another, as indicated in the illustration by the parallel lines. The viewing surfaces 28d, 28e and 30b may appear in the view finder 32 of the camera.

I claim:

1. Optical apparatus for indicating the depth of focus of a photographic lens for a given aperture with respect to a focussing scale, comprising a pointer moving in accordance with the lens aperture, optical means for producing two virtual images of said pointer in a viewing field, said optical means being shaped so that the distance between said images varies with the position of said pointer, and means for viewing a focussing scale of said lens in conjunction with said images.

2. Optical apparatus as recited in claim 1, in which said optical means is a prism of transparent material with a slit in the region of an axis of said prism, a light meter carrying said pointer and moving it in said slit, said prism havng curved totally-reflecting sides located on each side of said slit and shaped to produce said two images in two viewing surfaces of said prism.

3. Optical apparatus as recited in claim 1, and comprising a lens iris ring, a pointer moved rectilinearly thereby, a prism of transparent material with a straight slit therein along an axis of symmetry of said prism, curved totally reflecting sides to said prism located on each side of said slit, and means for guiding said pointer in said slit.

4. Optical apparatus as recited in claim 1 in which said optical means consists of optically conducting fibres closely bundled at one of their ends to form an objective surface and separated into two bundles to form two viewing surfaces at their other ends, and a pointer moved over said objective surface in accordance with the aperture setting of said photographic lens.

5. Optical apparatus for indicating the depth of focus of a photographic lens for a given aperture with respect to a focussing scale, comprising a pointer moving in accordance with the lens aperture, optical means for producing two virtual images of said pointer in a viewing field, a range scale moved by the focussing action of said lens, and means for viewing said scale simultaneously with said virtual images in said viewing field.

6. Optical apparatus as recited in claim 5 comprising a focussing ring with calibrations, and a prism of transparent material shaped to provide a double total internal reflection of said calibrations, one face of said prism being located near said ring and another face being located in said viewing field.

7. Optical apparatus as recited in claim 5 in which said range scale is located in said viewing field, adjacent said virtual images.

8. Optical apparatus as recited in claim 5 in which both the optical means for producing said two virtual images and the means for viewing said range scale are totally internally reflecting prisms composed of transparent plastics material.

9. Optical apparatus as recited in claim 5 wherein both the means for producing said two virtual images and the means for viewing said scale consist of bundles of optically conducting fibres.

10. Optical apparatus as recited in claim 5 wherein the means for viewing said scale consists of a bundle of optically conducting fibres one end of said bundle being located near said range scale and the other end in said viewing field.

11. Optical apparatus as recited in claim 8 in which said prism provided to produce said virtual pointer images and said prism serving for viewing said focussing range scale are combined in a single prism body.

References Cited

UNITED STATES PATENTS 3,174,416   3/1965   Heerklotz _____ 95—44

NORTON ANSHER, *Primary Examiner.*

G. M. HOFFMAN, *Assistant Examiner.*